United States Patent
Ren et al.

(10) Patent No.: US 8,565,215 B2
(45) Date of Patent: Oct. 22, 2013

(54) METHOD AND BASE STATION FOR DETECTING INTERFERING BASE STATION

(71) Applicant: Huawei Technologies Co., Ltd., Shenzhen (CN)

(72) Inventors: Cuihong Ren, Xi'an (CN); Wutao Yang, Xi'an (CN); Shaojun Xu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/712,680

(22) Filed: Dec. 12, 2012

(65) Prior Publication Data

US 2013/0100823 A1  Apr. 25, 2013

Related U.S. Application Data

(63) Continuation of application No. PCT/CN2012/071080, filed on Feb. 13, 2012.

(30) Foreign Application Priority Data

Sep. 22, 2011 (CN) .......................... 2011 1 0282098

(51) Int. Cl.
*H04J 3/06* (2006.01)
(52) U.S. Cl.
USPC ........ 370/350; 455/432.1; 455/434; 455/436; 455/445; 455/450
(58) Field of Classification Search
None
See application file for complete search history.

(56) References Cited

U.S. PATENT DOCUMENTS

| 6,359,869 B1* | 3/2002 | Sonetaka ....................... 370/337 |
| 6,493,539 B1* | 12/2002 | Falco et al. ................. 455/67.11 |
| 2005/0277425 A1 | 12/2005 | Niemela et al. |
| 2009/0122782 A1* | 5/2009 | Horn et al. ..................... 370/350 |
| 2009/0197631 A1 | 8/2009 | Palanki et al. |

FOREIGN PATENT DOCUMENTS

| CN | 1985448 A | 6/2007 |
| CN | 101150825 A | 3/2008 |
| CN | 102045738 A | 5/2011 |
| CN | 102217361 A | 10/2011 |

OTHER PUBLICATIONS

International Search Report and Written Opinion of the International Searching Authority received in Application No. PCT/CN2012/071080, mailed Jun. 28, 2012, 30 pages.

\* cited by examiner

*Primary Examiner* — Ian N Moore
*Assistant Examiner* — Brian T Le
(74) *Attorney, Agent, or Firm* — Slater & Matsil, L.L.P.

(57) ABSTRACT

A method and a base station can be used for detecting an interfering base station. A second base station sends no second downlink synchronization code in a downlink pilot time slot DwPTS of a specified frame, so that the second base station receives a first downlink synchronization code in a downlink pilot time slot DwPTS of a first base station, and performs correlation calculation on a detecting code segment of uplink data of the second base station by using the first downlink synchronization code, and by judging whether a correlation value of one of detecting code segments in the uplink data is greater than a correlation value threshold, determines whether the second base station is an interfering base station of the first base station.

15 Claims, 5 Drawing Sheets

METHOD AND BASE STATION FOR DETECTING INTERFERING BASE STATION

This application is a continuation of International Application No. PCT/CN2012/071080, filed Feb. 13, 2012, which claims priority to Chinese Patent Application No. 201110282098.0, filed Sep. 22, 2011, both of which applications are incorporated herein by reference.

TECHNICAL FIELD

The present invention relates to the field of communications, and in particular, to a method and a base station for detecting an interfering base station in a communication system.

BACKGROUND

A TD-SCDMA system is subjected to many kinds of interference, which may be classified into intra-system interference and extra-system interference in terms of an interference source. Most of extra-system interference comes from various communication devices in which transmission of other signals has a period, such as microwave transmission, a mobile television, and civilian and police antennas. A communication device leaks part of power to a frequency band of the TD-SCDMA system, thereby causing interference with the TD-SCDMA system. The extra-system interference affects the TD-SCDMA system slightly, and may affect only a coverage area of several devices. The intra-system interference is mainly caused by a GPS timing offset or interference of a remote base station. The GPS timing offset may be caused by a fault of a device, while the interference of the remote base station is an unavoidable problem for all time division mobile communication systems. The remote base station refers to a base station that is far from the TD-SCDMA system and in which a signal may be neglected theoretically.

FIG. 1 is a schematic diagram of a frame structure of an existing TD-SCDMA system. A TD-SCDMA frame includes: DwPTS (Downlink Pilot Time slot, downlink pilot time slot), UpPTS (Uplink Pilot Time slot), and GP (Guard Period) special time slots, and TS0-TS6 normal time slots. The DwPTS and UpPTS are used as uplink synchronization and downlink synchronization respectively, and do not bear user data. The GP is used as propagation delay guard in an uplink synchronization establishment process, and TS0-TS6 are used to bear user data or control information. In FIG. 1, only TS0 and TS1 are schematically shown for normal time slots. In the TD-SCDMA system, the length of each frame is 10 ms, one 10 ms frame is divided into two sub-frames with completely the same structure, each sub-frame has a time length of 5 ms, and each sub-frame is further divided into seven normal time slots each with a length of 675 μs and three special time slots. A guard interval GP (Guard Period) for downlink-to-uplink switching is 75 μs, and when it is converted to a space transmission distance of a signal, the space transmission distance is 22.5 km, and a cell radius corresponding to the distance is 11.25 km. For interference between base stations, a corresponding interference distance for synchronized base stations is 22.5 km.

It can be seen from the frame structure of the TD-SCDMA system that, after reaching a target base station after a propagation delay, TS0 and DwPTS of a base station at a distance of more than 22.5 km may cause interference with an UpPTS and even an uplink service time slot of the target base station. Moreover, a large number of remote base stations exist in some cases, and therefore their interference cannot be neglected.

FIG. 2 is a schematic diagram showing that a frame of an interfering base station reaches an interfered base station after different delays. Due to different distances and delays, finally generated interference affects different areas.

As shown in FIG. 2, when a signal of the interfering base station reaches the interfered base station after a delay of time t1, a downlink pilot time slot DwPTS of the interfering base station only causes interference with a GP of the interfered base station, and does not cause interference with an UpPTS of the interfered base station at this time. When the signal of the interfering base station reaches the interfered base station after a delay of time t2, the downlink pilot time slot DwPTS of the interfering base station causes interference with both the GP and the UpPTS of the interfered base station, and does not cause interference with TS1 of the interfered base station. When the signal of the interfering base station reaches the interfered base station after a delay of time t3, the DwPTS of the interfering base station causes interference with TS1 of the interfered base station.

Generally, attenuation of signal propagation between base stations is greater than loss of propagation in free space, and a signal has already been attenuated below a noise floor in a distance protection range that corresponds to a GP. However, in a macro cell, propagation manners of a wireless signal around a 2 GHz frequency band in space mainly include free space propagation, troposcatter, diffraction of a wireless signal, and so on. Under a certain meteorological condition, due to influence of atmospheric refraction, a propagation path of an electromagnetic wave that is propagated in a surface layer bends towards the earth's surface. When a curvature exceeds a curvature of the earth's surface, the electromagnetic wave may partially propagate in a thin atmospheric layer with a certain thickness, just like the electromagnetic wave propagates in a metallic waveguide, and this phenomenon is referred to as atmospheric duct propagation of the electromagnetic wave. At this time, a wireless signal that passes through a waveguide causes interference with an uplink pilot time slot UpPTS after a GP and even with TS1 and TS2 time slots of an uplink signal. Interference superposition of a large number of remote base stations is random strong interference, and the strength may be tens of dBs higher than a noise floor. The interference strength may be −100 dBm to −80 dBm for the TD-SCDMA system.

When a downlink pilot time slot DwPTS interferes with an uplink pilot time slot UpPTS, synchronization of an uplink signal of a user may be affected. When interference is large, detection failures of an UpPCH (Uplink Pilot Channel) increase, which may even interfere with an uplink time slot, so that the user cannot perform access. Moreover, such interference has certain randomness and unpredictability, which causes a difficulty in positioning of the interference. Therefore, accurately positioning an interference source so as to take a proper measure for the interference source to avoid interference of the interference source with an uplink signal is an urgent technical problem to be solved.

SUMMARY OF THE INVENTION

Embodiments of the present invention provide a method and a base station for detecting an interfering base station, where a second base station sends no second downlink synchronization code in a downlink pilot time slot DwPTS of a specified frame, so that the second base station receives a first downlink synchronization code in a downlink pilot time slot DwPTS of a first base station, and performs correlation calculation on uplink data of the second base station by using the first downlink synchronization code, and determines, by judging whether a correlation value of one of detecting code segments in the uplink data is greater than a correlation value threshold, whether the second base station is an interfering base station of the first base station.

In order to achieve the foregoing objective, the embodiments of the present invention adopt the following technical solutions.

In one aspect, an embodiment of the present invention provides a method for detecting an interfering base station in a communication system. A second base station receives a first downlink synchronization code in a downlink pilot time slot DwPTS of a first base station. The second base station acquires uplink data in a specified frame and determines that the second base station is an interfering base station of the first base station if data matched with the first downlink synchronization code exists in the uplink data in the specified frame. The second base station sends no second downlink synchronization code in a downlink pilot time slot DwPTS of the specified frame. The second downlink synchronization code is the same as the first downlink synchronization code.

In another aspect, an embodiment of the present invention provides a base station for detecting an interfering base station in a communication system. The base station includes a first processor that is configured to receive a first downlink synchronization code in a downlink pilot time slot DwPTS of a first base station. A second processor is configured to acquire uplink data in a specified frame and to determine that a second base station is an interfering base station of the first base station if data matched with the first downlink synchronization code exists in the uplink data in the specified frame.

Compared with the prior art, in the technical solutions provided in the embodiments of the present invention, the second base station sends no second downlink synchronization code in the downlink pilot time slot DwPTS of the specified frame, so that the second base station receives the first downlink synchronization code in the downlink pilot time slot DwPTS of the first base station, and performs correlation calculation on the uplink data of the second base station by using the first downlink synchronization code, and determines, by judging whether the correlation value of the one of detecting code segments in the uplink data is greater than the correlation value threshold, whether the second base station is the interfering base station of the first base station.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following descriptions are merely some embodiments of the present invention, and persons of ordinary skill in the art may still obtain other drawings according to these accompanying drawings without creative efforts.

DETAILED DESCRIPTION OF ILLUSTRATIVE EMBODIMENTS

Embodiments of the present invention provide a method and a base station for detecting an interfering base station, where a second base station sends no second downlink synchronization code in a downlink pilot time slot DwPTS of a specified frame, so that the second base station receives a first downlink synchronization code in a downlink pilot time slot DwPTS of a first base station, and performs correlation calculation on uplink data of the second base station by using the first downlink synchronization code, and determines, by judging whether a correlation value of one of detecting code segments in the uplink data is greater than a correlation value threshold, whether the second base station is an interfering base station of the first base station.

The technical solutions in the embodiments of the present invention are described clearly and completely in the following with reference to the accompanying drawings in the embodiments of the present invention. Apparently, the embodiments to be described are merely a part rather than all of the embodiments of the present invention. Based on the embodiments of the present invention, all other embodiments obtained by persons of ordinary skill without creative efforts shall fall within the protection scope of the present invention.

Figure 1:
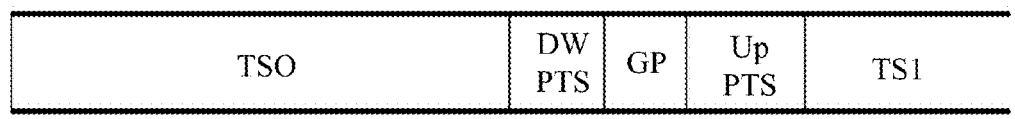
FIG. 1 shows a frame structure of an existing TD-SCDMA system.
Figure 2:
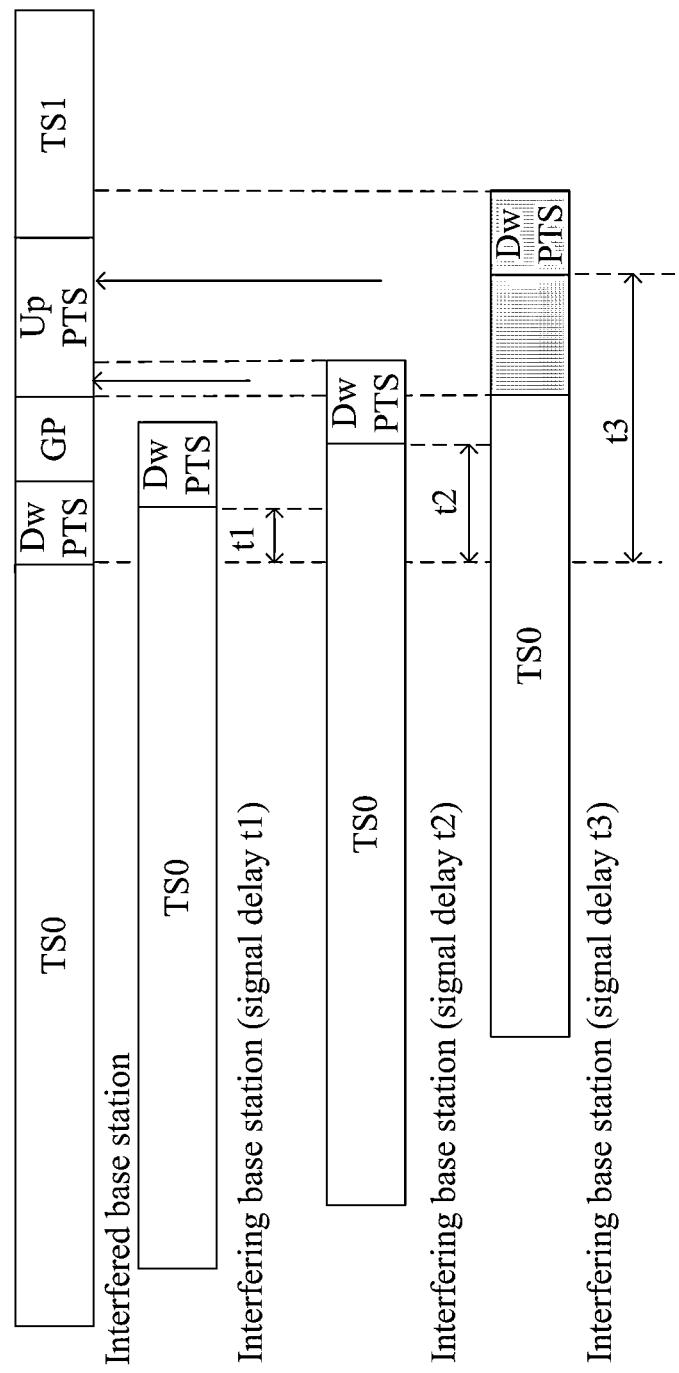
FIG. 2 is a diagram showing a principle of remote interference of a TD-SCDMA base station in the prior art.
Figure 3:
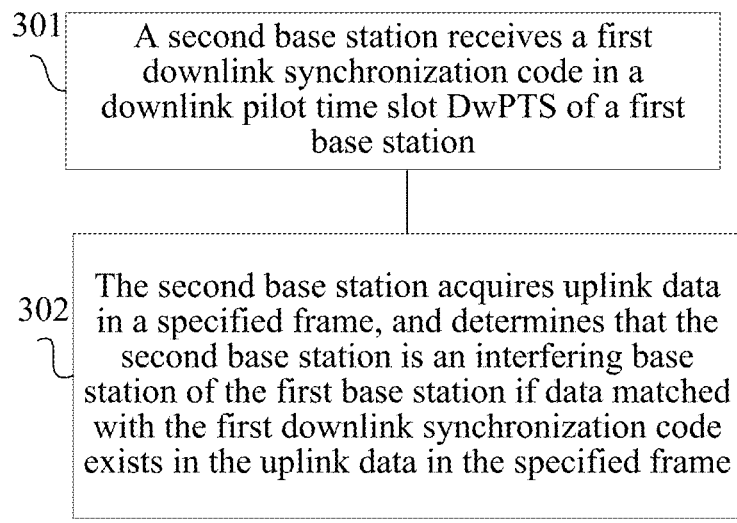
FIG. 3 is a flow chart of a method according to a first embodiment of the present invention.

An embodiment of the present invention provides a method for detecting an interfering base station. As shown in FIG. 3, the method includes the following steps.

Step 301: A second base station receives a first downlink synchronization code in a downlink pilot time slot DwPTS of a first base station.

Step 302: The second base station acquires uplink data in a specified frame, and determines that the second base station is an interfering base station of the first base station if data matched with the first downlink synchronization code exists in the uplink data in the specified frame.

The second base station sends no second downlink synchronization code in a downlink pilot time slot DwPTS of the specified frame, where the second downlink synchronization code is the same as the first downlink synchronization code.

In an embodiment of Step 302, the second base station acquires uplink data in a specified frame. The second base station acquires the uplink data in the specified frame, where the uplink data includes m detecting code segments, each detecting code segment includes n codes, m is equal to the number of codes included in the uplink data in the specified frame, n is equal to the number of codes included in the first downlink synchronization code, $\tau$ represents a sequence number of a detecting code segment, codes included in a $\tau^{th}$ detecting code segment are codes from a $\tau^{th}$ code to a $(\tau+n-1)^{th}$ code in the uplink data, codes included in a $(\tau+1)^{th}$ detecting code segment are codes from a $(\tau+1)^{th}$ code to a $(\tau+1+n-1)^{th}$ code in the uplink data, and $1 \leq \tau \leq m$; the second base station performs correlation calculation on each detecting code segment by using the first downlink synchronization code to obtain a correlation value of each detecting code segment, and determines that data matched with the first downlink synchronization code exists in the uplink data in the specified frame if a correlation value of one of detecting code segments is greater than a preset correlation value threshold.

Because the second base station sends no second downlink synchronization code in the downlink pilot time slot DwPTS of the specified frame, if the second base station, after acquiring the uplink data in the specified frame, finds that the data matched with the first downlink synchronization code exists, it may further be determined that the second base station is subjected to interference from the first downlink synchronization code in the DwPTS of the first base station. Due to mutuality of interference, it may also be determined that the first base station is also subjected to interference of the second base station.

In this embodiment, each detecting code segment in the uplink data refers to a segment of continuous code elements on which correlation calculation needs to be performed by using the first downlink synchronization code in all uplink data received by the second base station. Because the first downlink synchronization code is a 64-bit code element, each detecting code segment also has 64 bits, that is, n is 64.

In this embodiment, because a Gp time slot, an UpPTS time slot, and a TS1 time slot are uplink time slots, the uplink data of the second base station refers to data in the Gp time slot, the UpPTS time slot, and the TS1 time slot. Because the Gp time slot has 96-bit data, the UpPTS time slot has 128 codes, and the TS1 time slot has 704 codes, the uplink data in the specified frame of the second base station has a total of 928 codes. Each detecting code segment has 64 codes, and therefore multiple detecting code segments are included in the specified frame. In this embodiment, the uplink data that is in the specified frame and received by the second base station has 928 codes in total. It is assumed that codes from a $1^{st}$ code to a $64^{th}$ code are a detecting code segment 1, codes from a $2^{nd}$ code to a $65^{th}$ code are a detecting code segment 2, codes from a $3^{rd}$ code to a $66^{th}$ code are a detecting code segment 3, and so on.

Because the Gp time slot has 96 codes, the UpPTS time slot has 128 codes, and the TS1 time slot has 704 codes, uplink data that is of three time slots and received by the second base station in the specified frame has 928 codes in total. The number of codes in a detecting code segment beginning from 866 is less than 64, and at this time, the detecting code segment needs to be filled with a number "0", so that each detecting code segment has 64 codes.

When correlation calculation is performed on detecting code segments of the uplink data by using the first downlink synchronization code, correlation calculation needs to be performed on each detecting code segment in order. In a specific embodiment first, correlation calculation is performed on a first detecting code segment by using the first downlink synchronization code to obtain a correlation value of the first detecting code segment. Then, correlation calculation is performed on a second detecting code segment to obtain a correlation value of the second detecting code segment, and so on, where the second detecting code segment is codes from the $2^{nd}$ code to the $65^{th}$ code in the uplink data.

Referring to the foregoing method, after a correlation value of one of detecting code segments is calculated each time, a next detecting code segment is selected, and correlation calculation is performed on the next detecting code segment to obtain a correlation value of the detecting code segment.

The second base station performs correlation calculation on each detecting code segment by using the first downlink synchronization code to obtain a correlation value of each detecting code segment, and compares the correlation value of each detecting code segment with a correlation value threshold to determine whether a certain detecting code segment whose correlation value is greater than a correlation value threshold exists, and if a certain detecting code segment whose correlation value is greater than a correlation value threshold exists, it may be determined whether the second base station is an interfering base station of the first base station.

Figure 4:
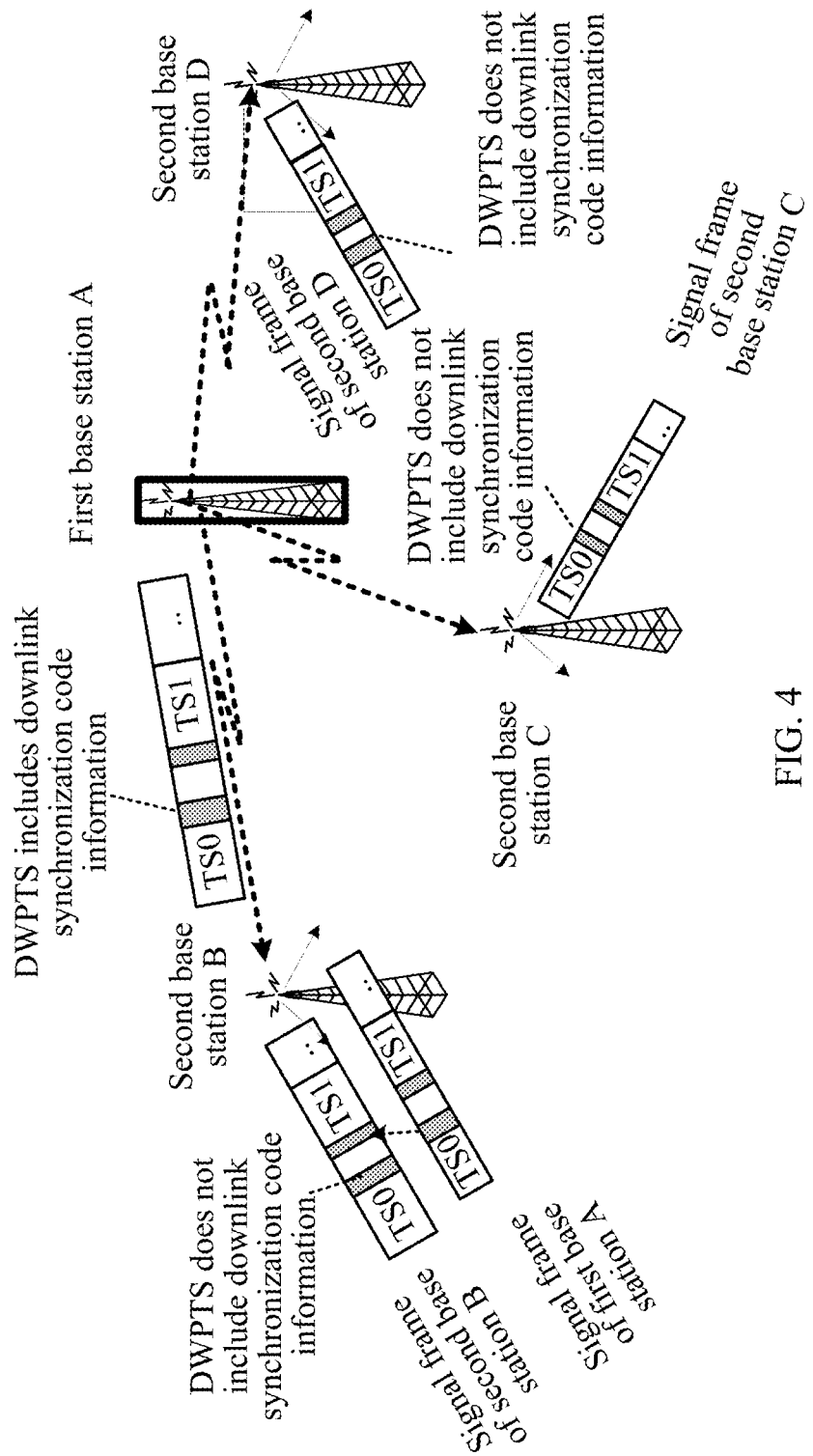
FIG. 4 is a network topology diagram of a method according to an embodiment of the present invention.

FIG. 4 is a network topology diagram according to this embodiment. As shown in FIG. 4, there are multiple second base stations, which are a second base station B, a second base station C and a second base station D respectively. The second base station B is taken as an example for description in this embodiment, and processes of detecting an interfering base station of the second base station C and the second base station D are similar to a process of detecting an interfering base station of the second base station B. The first base station is a first base station A in FIG. 4. In a detecting process, the first base station receives and sends data normally, and the second base station B sends no second downlink synchronization code in a downlink pilot time slot DwPTS of a specified frame. The second base station B itself or a network side device may specify a random frame, so that the second base station B acquires uplink data in the specified frame, and meanwhile receives the second base station B receives a first downlink synchronization code in a downlink pilot time slot DwPTS of the first base station A and performs correlation calculation on each detecting code segment in the uplink data by using the first downlink synchronization code, and if a correlation value of a certain detecting code segment is greater than a correlation value threshold, determines that the second base station B is an interfering base station of the first base station A.

Figure 5:
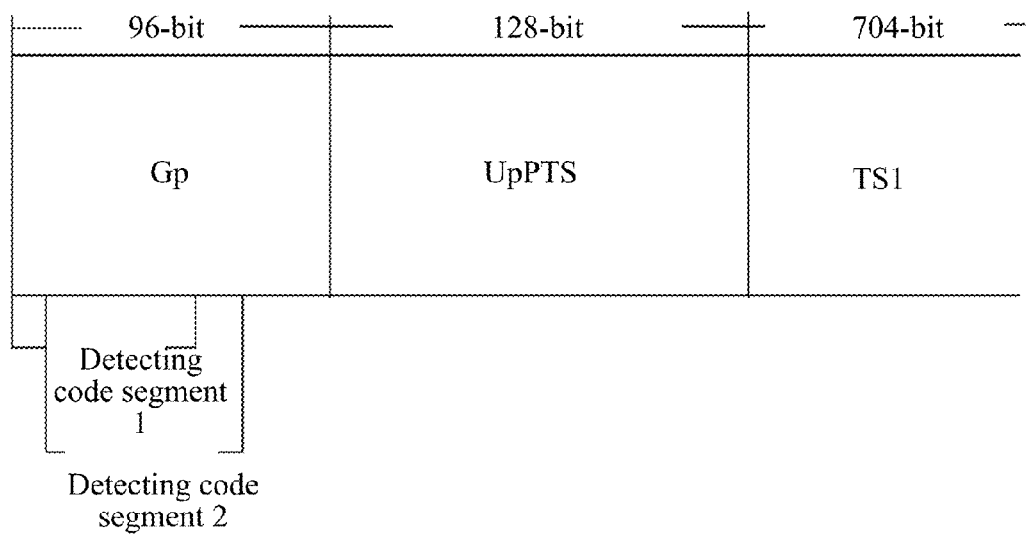
FIG. 5 is a schematic diagram of a method in which correlation calculation is performed on uplink data according to the present invention.
Figure 6:
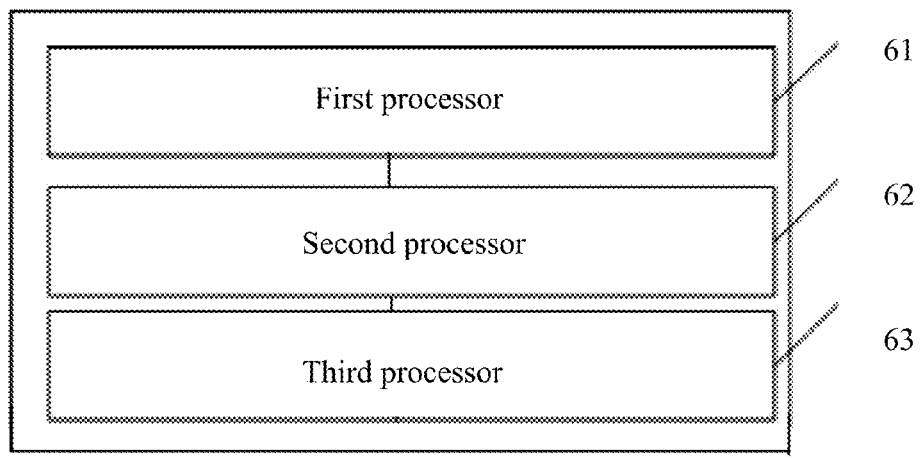
FIG. 6 is a block diagram showing a principle of a base station according to an embodiment of the present invention.

To describe the method according to the present invention more clearly, a detailed process of performing correlation calculation on the uplink data of the second base station B by using the first downlink synchronization code is further described with reference to FIG. 5 in this embodiment. In this embodiment, the uplink data of the second base station B refers to data of a Gp time slot, an UpPTS time slot, and a TS1 time slot. As shown in FIG. 5, performing correlation calculation on the uplink data of the second base station B by using the first downlink synchronization code actually is performing correlation calculation on data of three time slots, namely, the Gp time slot, the UpPTS time slot, and the TS1 time slot, of the second base station. In the prior art, each downlink synchronization code has 64 codes, the Gp time slot has 96 codes, the UpPTS time slot has 128 codes, and the TS1 time slot has 704 codes.

Each time when a correlation value of a previous detecting code segment is calculated, a next detecting code segment is selected for correlation calculation.

When performing correlation calculation, the second base station B performs correlation calculation on the uplink data in turn by using the first downlink synchronization code received from the first base station A, and detailed steps are:

A first step: The second base station marks the first downlink synchronization code as $s_i$, and converts the first downlink synchronization code $s_i$ into a complex number, which is marked as $DwPTS_i$.

In the foregoing, a specific conversion formula for converting the first downlink synchronization code $s_i$ into a complex number $DwPTS_i$ is:

$$DwPTS_i = \begin{cases} \underline{s_i} & 1 \leq i \leq 64 \\ 0 & else \end{cases}$$

In the formula:

$\underline{s_i} = (j)^i \cdot s_i$ where $s_i \in \{1, -1\}$; $i = 1, \ldots, 64$;

$s_i$ is the first downlink synchronization code;

$DwPTS_i$ is a first downlink synchronization code after being converted into the complex number; and j is a complex number and is a root of a value "−1".

A second step: Demodulate each detecting code segment to obtain IQ stream data of each detecting code segment.

Optionally, when demodulating the acquired uplink data in the specified frame, the second base station B may demodulate only a detecting code segment on which correlation calculation needs to be performed in the uplink data to obtain IQ stream data of the detecting code segment; and may also demodulate all uplink data to obtain IQ stream data of all the uplink data.

A third step: Perform correlation calculation on the IQ stream data by using $DwPTS_i$ to obtain a correlation value of each detecting code segment.

When only a detecting code segment on which correlation calculation needs to be performed in the uplink data is demodulated to obtain IQ stream data of the detecting code segment, as shown in FIG. 5, when correlation calculation is performed on data of a detecting code segment 1, only the detecting code segment 1 is demodulated to obtain IQ stream data of the detecting code segment 1; and when correlation calculation is performed on data of a detecting code segment 2, only the detecting code segment 2 is demodulated to obtain IQ stream data of the detecting code segment 2, and so on.

A detecting code segment is a segment of code elements on which correlation calculation needs to be performed by using the first downlink synchronization code in the uplink data acquired by the second base station. Because the first downlink synchronization code has 64 codes, each detecting code segment includes data of 64 codes.

When all uplink data is demodulated to obtain IQ stream data of all the uplink data, as shown in FIG. 5, when correlation calculation is performed on the detecting code segment 1, only IQ stream data that belongs to the detecting code segment 1 in all the uplink data is obtained; and when correlation calculation is performed on the detecting code segment 2, only IQ stream data that belongs to the detecting code segment 2 in all the uplink data is obtained. A detecting code segment is a segment of continuous code elements on which correlation calculation needs to be performed by using the first downlink synchronization code in the uplink data acquired by the second base station. Because the first downlink synchronization code has 64 codes, each detecting code segment includes continuous uplink data of 64 codes.

The second base station performs correlation calculation on the IQ stream data by using $DwPTS_i$ in turn to obtain a correlation value of each detecting code segment. In actual application, the second base station performs correlation calculation on codes from a $1^{st}$ code to a $64^{th}$ code in a Gp time slot first by using $DwPTS_i$, where the codes from the $1^{st}$ code to the $64^{th}$ code from the beginning in the Gp are defined as a detecting code segment 1, and a specific calculation formula is:

$$R(\tau) = \sum_{k=1}^{m} \sum_{i=1}^{64} (DwPTS_i)^* \cdot IQ_{\tau+i-64}^k$$

where:

$$IQ = \begin{cases} IQ_i^k & 1 \le i \le Len(IQ),\ 1 < k < m \\ 0 & else \end{cases}$$

$R(\tau)$ represents a correlation value obtained by performing correlation calculation on a $\tau^{th}$ detecting code segment by using the first downlink synchronization code.

$\tau$ represents a sequence number of a detecting code segment. When correlation calculation is performed on the detecting code segment 1, $\tau$ is 1, which indicates that correlation calculation is performed on codes from a $1^{st}$ code to a $64^{th}$ code in the uplink data; when correlation calculation is performed on the detecting code segment 2, $\tau$ is 2, which indicates that correlation calculation is performed on codes from a $2^{nd}$ code to a $65^{th}$ code in the uplink data; when correlation calculation is performed on a detecting code segment 3, $\tau$ is 3, which indicates that correlation calculation is performed on codes from a $3^{rd}$ code to a $66^{th}$ code in the uplink data, and so on.

len(IQ) represents calculating the length of the IQ stream data, which may be a user-defined function whose function may be implemented through software.

m is equal to the number of codes included in the uplink data in the specified frame, and therefore m is also the number of times of performing correlation calculation on the uplink data. In this embodiment, because correlation calculation is performed only on the Gp time slot, the UpPTS time slot, and the TS1 time slot in the uplink data, and a total number of codes in the Gp time slot, the UpPTS time slot, and the TS1 time slot is 928, Ka is 928 in this embodiment, which indicates that correlation calculation needs to be performed 928 times in total.

Correlation values of all detecting code segments are judged, and if a certain detecting code segment whose correlation value is greater than a preset correlation value threshold exists, it is determined that the second base station B is the interfering base station of the first base station A.

Through the foregoing method, the second base station, after obtaining a correlation value of each detecting code segment in the uplink data, may calculate power of each detecting code segment according to the correlation value of each detecting code segment, where the power is power of interference of the first downlink synchronization code with each corresponding detecting code segment.

Preferably, to position the interfering base station more accurately, after the second base station detects the correlation value of each detecting code segment in the uplink data, the second base station calculates a correlation value peak-to-average ratio of each detecting code segment according to the correlation value of each detecting code segment, and if a certain detecting code segment whose correlation value peak-to-average ratio is greater than a correlation value peak-to-average ratio threshold exists, it is determined that the second base station is the interfering base station of the first base station.

The second base station calculates a correlation value peak-to-average ratio of each detecting code segment according to the correlation value of each detecting code segment, which specifically is:

$$PAR(\tau) = \frac{P(\tau)}{A(\tau)}$$

where:

$P(\tau) = |R(\tau)|^2$ $A(\tau) = [sum(R(|(\tau-10)|^2 : |R(\tau-6)|^2 + sum(|R(\tau+10)|^2 : |R(\tau+14)|^2)]/10$ a function sum ( ) represents summing numbers in brackets.

Through the foregoing method, the second base station, after obtaining the correlation value of each detecting code segment in the uplink data, may calculate a correlation value peak-to-average ratio of each detecting code segment according to the correlation value of each detecting code segment, and by determining a maximum value in correlation value peak-to-average ratios of detecting code segments, determine that a detecting code segment corresponding to a maximum correlation value peak-to-average ratio is most seriously interfered with by the first downlink synchronization code.

After the detecting code segment most seriously interfered with by the first downlink synchronization code is determined, a sequence number $\tau_{max}$ of a detecting code segment that corresponds to a maximum value of the correlation value peak-to-average ratio may be known.

The second base station obtains a correlation value $R(\tau_{max})$ of a detecting code segment that corresponds to the uplink data $\tau_{max}$, and calculates power of the detecting code segment according to $R(\tau_{max})$, where the power of the detecting code segment is power of interference, and a specific calculation formula is:

$$P_{in}=10*\log 10(|R(\tau_{max})|^2/64/64/8)-126.3$$

where:

$$\tau_{max}=\arg\max[M(\tau)]$$

$$M(\tau)=P(\tau)\cdot PAR(\tau);$$

$$P(\tau)=|R(\tau)|^2,$$

$$PAR(\tau) = \frac{P(\tau)}{A(\tau)};$$

$$A(\tau)=[\text{sum}(|R(\tau-10)|^2:|R(\tau-6)|^2+\text{sum}(|R(\tau+10)|^2:|R(\tau+14)|^2)]/10;$$

a function argmax( ) represents calculating a maximum value; and $\tau_{max}$ represents the sequence number of the detecting code segment that corresponds to the maximum value of the correlation value peak-to-average ratio.

In this method, the correlation value peak-to-average ratio of the detecting code segment is calculated to know the detecting code segment most seriously interfered with, and the power of the detecting code segment is calculated, where the power is power of interference of the first downlink synchronization code with the second base station. It can be known from mutuality of interference that, the power is also power of interference of the second base station with the first base station.

An embodiment of the present invention further provides a base station. A first processor 61 is configured to receive a first downlink synchronization code in a downlink pilot time slot DwPTS of a first base station. A second processor 62 is configured to acquire uplink data in a specified frame and to determine that a second base station is an interfering base station of the first base station if data matched with the first downlink synchronization code exists in the uplink data in the specified frame.

The second processor 62 acquires the uplink data in the specified frame and determines that the second base station is the interfering base station of the first base station if the data matched with the first downlink synchronization code exists in the uplink data in the specified frame. In specific embodiments, the second processor 62 acquires the uplink data in the specified frame. The uplink data includes m detecting code segments, each detecting code segment includes n codes, m is equal to the number of codes included in the uplink data in the specified frame, n is equal to the number of codes included in the first downlink synchronization code, $\tau$ represents a sequence number of a detecting code segment, codes included in a $\tau^{th}$ detecting code segment are codes from a $\tau^{th}$ code to a $(\tau+n-1)^{th}$ code in the uplink data, codes included in a $(\tau+1)^{th}$ detecting code segment are codes from a $(\tau+1)^{th}$ code to a $(\tau+1+n-1)^{th}$ code in the uplink data, and $1\leq\tau\leq m$;

The second processor 62 is specifically configured to perform correlation calculation on each detecting code segment by using the first downlink synchronization code to obtain a correlation value of each detecting code segment. The second processor 62 is further specifically configured to determine that data matched with the first downlink synchronization code exists in the uplink data in the specified frame if one of detecting code segments exists, where a correlation value of the one of detecting code segments is greater than a preset correlation value threshold.

The second processor 62 is configured to acquire the uplink data in the specified frame, and determine that the second base station is the interfering base station of the first base station if the data matched with the first downlink synchronization code exists in the uplink data in the specified frame.

In specific embodiments, the second processor 62 acquires the uplink data in the specified frame, where the uplink data includes m detecting code segments, each detecting code segment includes n codes, m is equal to the number of codes included in the uplink data in the specified frame, n is equal to the number of codes included in the first downlink synchronization code, $\tau$ represents a sequence number of a detecting code segment, codes included in a $\tau^{th}$ detecting code segment are codes from a $\tau^{th}$ code to a $(\tau+n-1)^{th}$ code in the uplink data, codes included in a $(\tau+1)^{th}$ detecting code segment are codes from a $(\tau+1)^{th}$ code to a $(\tau+1+n-1)^{th}$ code in the uplink data, and $1\leq\tau\leq m$. The second processor 62 is specifically configured to perform correlation calculation on each detecting code segment by using the first downlink synchronization code to obtain a correlation value of each detecting code segment, and calculate a correlation value peak-to-average ratio of each detecting code segment according to the correlation value of each detecting code segment. The second processor 62 is further specifically configured to determine that data matched with the first downlink synchronization code exists in the uplink data in the specified frame if a certain detecting code segment whose correlation value peak-to-average ratio is greater than a correlation value peak-to-average ratio threshold exists.

The second processor 62 is specifically configured to perform correlation calculation on each detecting code segment by using the first downlink synchronization code to obtain the correlation value of each detecting code segment. In specific embodiments the second processor 62 is specifically configured to mark the first downlink synchronization code as $s_i$, and convert the first downlink synchronization code $s_i$ into a complex number, which is marked as $DwPTS_i$. The second processor 62 is specifically configured to perform correlation calculation on each detecting code segment by using $DwPTS_i$ to obtain the correlation value of each detecting code segment.

The second processor 62 is specifically configured to perform correlation calculation on each detecting code segment by using $DwPTS_i$ to obtain the correlation value of each detecting code segment. The second processor 62 is configured to demodulate each detecting code segment to obtain IQ stream data of each detecting code segment. The second processor 62 is configured to perform correlation calculation on the IQ stream data by using $DwPTS_i$ to obtain the correlation value of each detecting code segment.

The second processor 62 is further configured to acquire a maximum value in correlation value peak-to-average ratios of all detecting code segments.

The base station further includes a third processor 63 that is configured to calculate, according to a maximum value of a correlation value peak-to-average ratio, power of a detecting code segment that corresponds to the maximum value of the correlation value peak-to-average ratio.

With reference to the description in the method embodiment, a terminal in this embodiment may further be configured to execute many steps, and an operating principle of the terminal is similar to that of the method embodiment, which is not described again.

Through the description of the foregoing implementation manners, persons skilled in the art may clearly understand that the present invention may be implemented by software plus necessary universal hardware, and definitely may also be implemented by hardware, but in most cases, the former is a preferred implementation manner. Based on such understanding, the technical solutions of the present invention or the part that makes contributions to the prior art may be substantially embodied in a form of a software product. The computer software product may be stored in a computer readable storage medium such as a floppy disk, a hard disk, or an optical disk of a computer, and includes several instructions to enable a computer device (for example, a personal computer, a server, or a network device, and so on) to execute the method described in the embodiments of the present invention.

The foregoing descriptions are merely exemplary embodiments of the present invention, but are not intended to limit the protection scope of the present invention. Any modification or replacement thought of by persons skilled in the art within the technical scope disclosed in the present invention shall fall within the protection scope of the present invention. Therefore, the protection scope of the present invention shall be subject to the protection scope of the claims.

What is claimed is:

1. A method for detecting an interfering base station, the method comprising:

receiving, by a second base station, a first downlink synchronization code in a downlink pilot time slot DwPTS of a first base station;

acquiring, by the second base station, uplink data in a specified frame, determining that the second base station is an interfering base station of the first base station if data matched with the first downlink synchronization code exists in the uplink data in the specified frame; and sending, by the second base station, no second downlink synchronization code in a downlink pilot time slot DwPTS of the specified frame, wherein the second downlink synchronization code is the same as the first downlink synchronization code;

wherein acquiring the uplink data in the specified frame and determining that the second base station is the interfering base station comprises:

acquiring, by the second base station, the uplink data in the specified frame, wherein the uplink data comprises m detecting code segments, each detecting code segment comprises n codes, m is equal to a number of codes comprised in the uplink data in the specified frame, n is equal to a number of codes comprised in the first downlink synchronization code, $\tau$ represents a sequence number of a detecting code segment, codes comprised in a $\tau^{th}$ detecting code segment are codes from a $\tau^{th}$ code to a $(\tau+n-1)^{th}$ code in the uplink data, codes comprised in a $(\tau+1)^{th}$ detecting code segment are codes from a $(\tau+1)^{th}$ code to a $(\tau+1+n-1)^{th}$ code in the uplink data, and $1 \leq \tau \leq m$; and performing, by the second base station, correlation calculation on each detecting code segment by using the first downlink synchronization code to obtain a correlation value of each detecting code segment, and calculating, by the second base station, a correlation value peak-to-average ratio of each detecting code segment according to the correlation value of each detecting code segment, and determining that the data matched with the first downlink synchronization code is exists in the uplink data in the specified frame if a correlation value peak-to-average ratio of one of detecting code segments is greater than a correlation value peak-to-average ratio threshold.

2. A method for detecting an interfering base station, the method comprising:

receiving, by a second base station, a first downlink synchronization code in a downlink pilot time slot DwPTS of a first base station;

acquiring, by the second base station, uplink data in a specified frame, determining that the second base station is an interfering base station of the first base station if data matched with the first downlink synchronization code exists in the uplink data in the specified frame; and sending, by the second base station, no second downlink synchronization code in a downlink pilot time slot DwPTS of the specified frame, wherein the second downlink synchronization code is the same as the first downlink synchronization code;

wherein acquiring, by the uplink data in the specified frame and determining that the second base station is the interfering base station comprises:

acquiring, by the second base station, the uplink data in the specified frame, wherein the uplink data comprises m detecting code segments, each detecting code segment comprises n codes, m is a number of codes comprised in the uplink data in the specified frame, n is a number of codes comprised in the first downlink synchronization code, $\tau$ represents a sequence number of a detecting code segment, codes comprised in a $\tau^{th}$ detecting code segment are codes from a $\tau^{th}$ code to a $(\tau+n-1)^{th}$ code in the uplink data, codes comprised in a $(\tau+1)^{th}$ detecting code segment are codes from a $(\tau+1)^{th}$ code to a $(\tau+1+n-1)^{th}$ code in the uplink data, and $1 \leq \tau \leq m$; and performing, by the second base station, correlation calculation on each detecting code segment by using the first downlink synchronization code to obtain a correlation value of each detecting code segment, and determining that the data matched with the first downlink synchronization code exists in the uplink data in the specified frame if a correlation value of one of detecting code segments is greater than a preset correlation value threshold.

3. The method according to claim 2, wherein performing correlation calculation on each detecting code segment comprising:

marking, by the second base station, the first downlink synchronization code as $s_i$, and converting the first downlink synchronization code $s_i$ into a complex number, which is marked as $DwPTS_i$; and performing, by the second base station, correlation calculation on each detecting code segment by using $DwPTS_i$ to obtain the correlation value of each detecting code segment.

4. The method according to claim 3, wherein a specific conversion formula for converting the first downlink synchronization code $s_i$ into a complex number $DwPTS_i$ comprises:

$$DwPTS_i = \begin{cases} \underline{s_i} & 1 \le i \le 64 \\ 0 & \text{else} \end{cases}$$

in the formula:

$$\underline{s_i} = (j)^i \cdot s_i$$

where $s_i \in \{1, -1\}$; $i = 1, \ldots, 64$;

$s_i$ is the first downlink synchronization code;

$DwPTS_i$ is a first downlink synchronization code after being converted into the complex number; and j is a complex number and is a root of a value "−1".

5. The method according to claim 3, wherein performing correlation calculation, comprises:

demodulating each detecting code segment to obtain IQ stream data of each detecting code segment; and performing correlation calculation on the IQ stream data by using the $DwPTS_i$ to obtain the correlation value of each detecting code segment.

6. The method according to claim 5, wherein a specific formula for performing correlation calculation on the IQ stream data in turn by using $DwPTS_i$ to obtain the correlation value of each detecting code segment is:

$$R(\tau) = \sum_{k=1}^{m} \sum_{i=1}^{64} (DwPTS_i)^* \cdot IQ_{\tau+i-64}^k$$

where:

$$IQ = \begin{cases} IQ_i^k & 1 \le i \le Len(IQ), 1 < k < m \\ 0 & \text{else} \end{cases}$$

where τ represents a sequence number of a detecting code segment, and len(IQ) represents calculating the length of the IQ stream data; and m is equal to the number of codes comprised in the uplink data in the specified frame.

7. The method according to claim 6, wherein the calculating, by the second base station, the correlation value peak-to-average ratio of each detecting code segment comprises:

$$PAR(\tau) = \frac{P(\tau)}{A(\tau)}$$

where:

$$P(\tau) = |R(\tau)|^2$$

$$A(\tau) = [\text{sum}(|R(\tau-10)|^2 : |R(\tau-6)|^2 + \text{sum}(|R(\tau+10)|^2 : |R(\tau+14)|^2)]/10$$

a function SUM( ) represents summing numbers in brackets.

8. The method according to claim 6, further comprising:

obtaining, by the second base station, a maximum value in correlation value peak-to-average ratios of detecting code segments in the uplink data, and calculating, according to a maximum value of a correlation value peak-to-average ratio, power of a detecting code segment that corresponds to the maximum value of the correlation value peak-to-average ratio, wherein a specific calculation formula is:

$$P_{in} = 10 * \log 10(|R(\tau_{max})|^2/64/64/8) - 126.3$$

where:

$$\tau_{max} = \arg\max[M(\tau)]$$

$$M(\tau) = P(\tau) \cdot PAR(\tau);$$

$$P(\tau) = |R(\tau)|^2,$$

$$PAR(\tau) = \frac{P(\tau)}{A(\tau)};$$

$$A(\tau) = [\text{sum}(|R(\tau-10)|^2 : |R(\tau-6)|^2 + \text{sum}(|R(\tau+10)|^2 : |R(\tau+14)|^2)]/10;$$

a function argmax( ) represents calculating a maximum value; and $\tau_{max}$ represents a sequence number of the detecting code segment that corresponds to the maximum value of the correlation value peak-to-average ratio.

9. The method according to claim 2, wherein the acquiring the uplink data in the specified frame specifically is:

acquiring uplink data of the second base station in three time slots Gp, UpPTS, and TS1 in the specified frame.

10. A base station, comprising:

a first processor, configured to receive a first downlink synchronization code in a downlink pilot time slot DwPTS of a first base station; and a second processor, configured to acquire uplink data in a specified frame, and determine that a second base station is an interfering base station of the first base station if data matched with the first downlink synchronization code exists in the uplink data in the specified frame;

wherein the second processor acquires the uplink data in the specified frame, and determine that the second base station is the interfering base station of the first base station if the data matched with the first downlink synchronization code exists in the uplink data in the specified frame, and:

wherein the second processor is configured to acquire the uplink data in the specified frame, wherein the uplink data comprises m detecting code segments, each detecting code segment comprises n codes, m is equal to a number of codes comprised in the uplink data in the specified frame, n is equal to a number of codes comprised in the first downlink synchronization code, τ represents a sequence number of a detecting code segment, codes comprised in a $\tau^{th}$ detecting code segment are codes from a $\tau^{th}$ code to a $(\tau+n-1)^{th}$ code in the uplink data, codes comprised in a $(\tau+1)^{th}$ detecting code segment are codes from a $(\tau+1)^{th}$ code to a $(\tau+1+n-1)^{th}$ code in the uplink data, and $1 \le \tau \le m$; perform correlation calculation on each detecting code segment by using the first downlink synchronization code to obtain a correlation value of each detecting code segment; and determine that the data matched with the first downlink synchronization code exists in the uplink data in the specified frame if a correlation value of one of detecting code segments is greater than a preset correlation value threshold.

11. The base station according to claim 10, wherein the second processor is specifically configured to perform correlation calculation on each detecting code segment by using the first downlink synchronization code to obtain the correlation value of each detecting code segment, wherein:
the second processor is specifically configured to mark the first downlink synchronization code as $s_i$, and convert the first downlink synchronization code into a complex number, which is marked as $DwPTS_i$; and
the second processor is specifically configured to perform correlation calculation on each detecting code segment by using $DwPTS_i$ to obtain the correlation value of each detecting code segment.

12. The base station according to claim 11, wherein the second processor is specifically configured to perform correlation calculation on each detecting code segment by using $DwPTS_i$ to obtain the correlation value of each detecting code segment, wherein:
the second processor is configured to demodulate each detecting code segment to obtain IQ stream data of each detecting code segment; and
the second processor is configured to perform correlation calculation on the IQ stream data by using $DwPTS_i$ to obtain the correlation value of each detecting code segment.

13. A base station, comprising:
a first processor, configured to receive a first downlink synchronization code in a downlink pilot time slot DwPTS of a first base station; and
a second processor, configured to acquire uplink data in a specified frame, and determine that a second base station is an interfering base station of the first base station if data matched with the first downlink synchronization code exists in the uplink data in the specified frame;
wherein the second processor acquires the uplink data in the specified frame, wherein the uplink data comprises m detecting code segments, each detecting code segment comprises n codes, m is equal to a number of codes comprised in the uplink data in the specified frame, n is equal to a number of codes comprised in the first downlink synchronization code, $\tau$ represents a sequence number of a detecting code segment, codes comprised in a $\tau^{th}$ detecting code segment are codes from a $\tau^{th}$ code to a $(\tau+n-1)^{th}$ code in the uplink data, codes comprised in a $(\tau+1)^{th}$ detecting code segment are codes from a $(\tau+1)^{th}$ code to a $(\tau+1+n-1)^{th}$ code in the uplink data, and $1 \leq \tau \leq m$; performs correlation calculation on each detecting code segment by using the first downlink synchronization code to obtain a correlation value of each detecting code segment, and calculates a correlation value peak-to-average ratio of each detecting code segment according to the correlation value of each detecting code segment; and determines that the data matched with the first downlink synchronization code exists in the uplink data in the specified frame if a correlation value peak-to-average ratio of one of detecting code segments is greater than a correlation value peak-to-average ratio threshold.

14. The base station according to claim 13, wherein the second processor is further configured to acquire a maximum value in correlation value peak-to-average ratios of all detecting code segments.

15. The base station according to claim 14, further comprising a third processor, configured to calculate, according to a maximum value of a correlation value peak-to-average ratio, power of a detecting code segment that corresponds to the maximum value of the correlation value peak-to-average ratio, wherein the power of the detecting code segment is power of interference of the second base station with the first base station.

* * * * *